US008632865B2

(12) United States Patent
Kim et al.

(10) Patent No.: US 8,632,865 B2
(45) Date of Patent: Jan. 21, 2014

(54) HEAT-SHRINKABLE POLYESTER FILM

(75) Inventors: Seong Do Kim, Suwon-si (KR); Tae Byoung Oh, Suwon-si (KR); Tae Houng Jeong, Suwon-si (KR)

(73) Assignee: SKC Co., Ltd, Suwon-si (KR)

( * ) Notice: Subject to any disclaimer, the term of this patent is extended or adjusted under 35 U.S.C. 154(b) by 273 days.

(21) Appl. No.: 13/041,831

(22) Filed: Mar. 7, 2011

(65) Prior Publication Data

US 2011/0224369 A1 Sep. 15, 2011

(30) Foreign Application Priority Data

Mar. 9, 2010 (KR) ........................ 10-2010-0020967

(51) Int. Cl.
*B32B 27/36* (2006.01)
*C08G 63/02* (2006.01)
*C08G 63/12* (2006.01)
*C08G 63/123* (2006.01)
*C08G 63/127* (2006.01)
*C08G 63/16* (2006.01)
*C08G 63/18* (2006.01)
*C08G 63/181* (2006.01)
*C08G 63/183* (2006.01)

(52) U.S. Cl.
USPC ......... 428/34.9; 428/35.1; 428/480; 528/308; 528/308.6; 528/308.7

(58) Field of Classification Search
None
See application file for complete search history.

(56) References Cited

U.S. PATENT DOCUMENTS

| 5,534,570 | A | * | 7/1996 | Shih et al. | .................... 524/114 |
| 5,589,126 | A | * | 12/1996 | Shih et al. | .................... 264/211 |
| 5,824,398 | A | * | 10/1998 | Shih | ........................ 428/195.1 |
| 6,413,596 | B1 | * | 7/2002 | Okuda et al. | ............... 428/34.7 |
| 7,303,812 | B2 | * | 12/2007 | Hashimoto et al. | ........ 428/318.6 |
| 2006/0233984 | A1 | * | 10/2006 | Suzuki et al. | ............... 428/34.9 |
| 2009/0202758 | A1 | * | 8/2009 | Hiruma et al. | .............. 428/34.9 |
| 2009/0202851 | A1 | * | 8/2009 | Maruichi et al. | ............ 428/483 |

FOREIGN PATENT DOCUMENTS

| EP | 0 409 288 A2 | 1/1991 |
| JP | 03/068634 A | 3/1991 |
| JP | 2009-161625 A | 7/2009 |
| WO | 2009/151290 A2 | 12/2009 |

OTHER PUBLICATIONS

Japanese Patent Office, Japanese Office Action issued in corresponding JP Application No. 2011-051400, dated Sep. 4, 2012.
Chinese Patent Office, Chinese Office Action issued in corresponding CN Application No. 201110057308.6, dated Mar. 31, 2012.
Taiwanese Patent Office, Taiwanese Office Action issued in corresponding TW Application No. 100107714, dated Jun. 10, 2013.

* cited by examiner

*Primary Examiner* — Vivian Chen
(74) *Attorney, Agent, or Firm* — Sughrue Mion, PLLC

(57) ABSTRACT

A heat-shrinkable polyester film having a heat-shrinkage change per degree Celsius (%/° C.) along the main shrinkage direction of 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C., has a good appearance quality after shrinkage and thus suitable for a wrapping material, particularly a label for a bottle.

6 Claims, 2 Drawing Sheets

HEAT-SHRINKABLE POLYESTER FILM

FIELD OF THE INVENTION

The present invention relates to a heat-shrinkable polyester film useful for a wrapping material, more particularly suitable for labeling a container due to its good finished appearance after shrinkage.

BACKGROUND OF THE INVENTION

Heat-shrinkable films which undergo shrinkage back to the pre-drawn form when heated at a predetermined temperature have been extensively used for labeling a glass or plastic bottle because of its properties that are suitable for printing various articles to attract consumers' attention and for full-wrapping various containers as well as packaging a bundle of goods.

Heat-shrinkable films made of soft polyvinyl chloride (PVC) have recently become disfavored because they exhibit a limited maximum heat-shrinkage ratio and emit toxic pollutants, e.g., dioxins, on combustion. Oriented polystyrene (OPS) films, on the other hand, have uniform shrinking properties and low specific gravities, and they can be easily removed from PET bottles for recycling, but they have the problem of poor heat-resistance. Therefore, such oriented polystyrene films are unsuitable for a high rate-shrinkage process or high temperature-filling process.

Heat-shrinkable polyester films which have improved shrinking properties and heat-resistance as compared with those of PVC and OPS films have been developed for wrapping a glass bottle. However, the shrinkage rates of such polyester films are generally unacceptably high, which results in non-uniform shrinkage when subjected to a thermal shrinkage process using hot air, and therefore, it necessary to use a steam-heating type shrinking machine to prevent non-uniform shrinkage of the film. In addition, the shrinkage stress of such polyester film is unacceptably high, which often leads to non-uniform shrinkage with consequential distortion, end-bending or rupture, especially when subjected to a secondary thermal shrinkage process, e.g., a sterilization or high temperature-filling process.

In order to solve the above problems, Korean Patent Laid-Open Publication No. 2002-0063158 discloses a copolymer composition comprising terephthalic acid, ethylene glycol, 1,4-cyclohexanedimethanol, and diethylene glycol, and a heat-shrinkable film prepared using the same which has a high softness and a PVC-like shrinking property; and Korean Patent Laid-Open Publication No. 2002-0062838 discloses a heat-shrinkable polyester film comprising a polyester elastomer in an amount of 5 wt % or more.

However, such heat-shrinkable polyester films shows a skirt phenomenon that a film labeled on a container having fixing point such as a square shape container is riding up at the center between the fixed points in the perpendicular to shrinkage direction, or a riding up phenomenon that a film labeled on a round container is wholly riding up in the perpendicular to shrinkage direction, and thus these conventional films cannot be effectively used for the protection of containers or indication of commercial product.

Moreover, conventional polyester films are also known to have shortcomings such as non-uniform heat-shrinkage and crinking during a high temperature shrinking process, which cause the deterioration of the appearance and quality of labeled containers.

SUMMARY OF THE INVENTION

Accordingly, it is an object of the present invention to provide a heat-shrinkable polyester film having a good appearance after shrinkage due to a uniform heat-shrinkage and a resistance to a riding up or skirt phenomenon, as well as improved characteristics in terms of printability, mechanical strength, heat-resistance, and shrinkage ratio.

In accordance with one aspect of the present invention, there is provided a heat-shrinkable polyester film which has a heat-shrinkage change per degree Celsius (%/° C.) along the main shrinkage direction of 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C.

The heat-shrinkable polyester film may be prepared by using a copolyester composition comprising: (i) a dibasic acid component comprising at least 90 mol % of terephthalic acid residue based on 100 mol % of the dibasic acid component; and (ii) a diol component comprising (a) 1 to 20 mol % of diethylene glycol, (b) 5 to 30 mol % of neopentyl glycol, and (c) 50 to 90 mol % of ethylene glycol, based on 100 mol % of the diol component.

Further, the heat-shrinkable polyester film can be prepared by a method comprising the steps of: (a) melt-extruding a copolyester composition to obtain a sheet and then drawing the sheet in the main shrinkage direction at a temperature ranging from Tg+5° C. to Tg+20° C. to obtain an oriented film; and (b) heat-treating the oriented film at a temperature ranges between Tg+5° C. and Tg+50° C.

The heat-shrinkable polyester film according to the present invention has improved performance characteristics in terms of printability, mechanical strength, heat-resistance, and shrinkability sufficient for full-wrapping. Moreover, the inventive film is resistant to a riding up or skirt phenomenon and has a relatively constant heat-shrinkage change over temperature. Accordingly, the inventive film does not show wrinkles and distortion after shrinkage, and thus it can attain a good appearance quality after shrinkage.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

The heat-shrinkable polyester film of the present invention has a heat-shrinkage change per degree Celsius (%/° C.) along the main shrinkage direction being 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C. For example, heat-shrinkage change over temperature along the main shrinkage direction, means a gradient of curve at each temperature region shown in FIG. 1.

Figure 1:
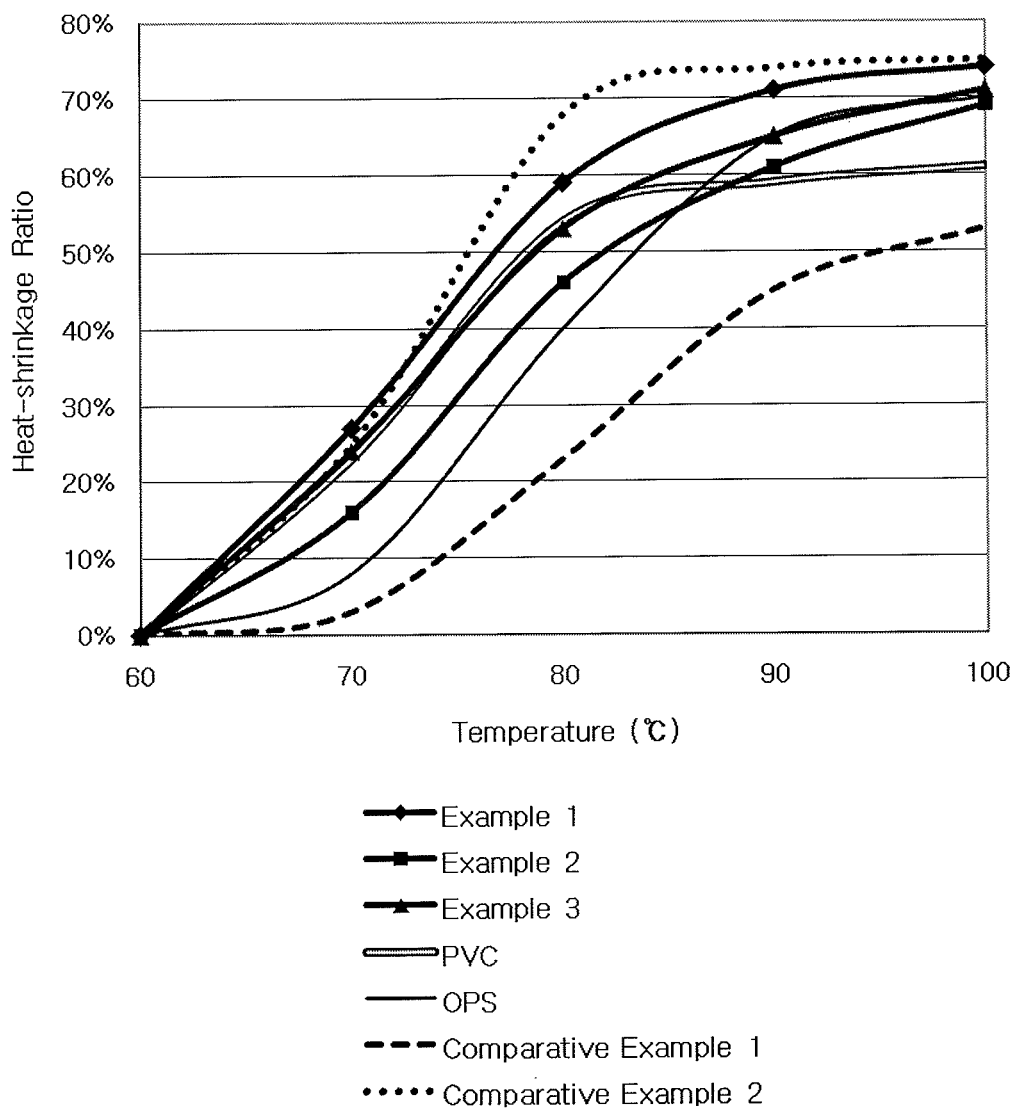
FIG. 1: heat-shrinkage change of the inventive polyester films according to the temperature.

As shown in FIG. 1, the heat-shrinkable polyester film of the present invention has a relatively constant change rate (i.e., gradient), and thus, the heat-shrinkage ratio does not change drastically in the entire temperature range, which is unlike conventional films. In particular, it is found from FIG. 1 that the inventive film shows substantially constant change rate, i.e., a straight line-like curve, at a temperature ranging from 60 to 80° C., which is similar to the heat-shrinkage property of a PVC film.

In accordance with a preferable example of the present invention, the heat-shrinkable polyester film may be prepared by using a copolyester composition comprising (i) a dibasic acid component comprising at least 90 mol % of terephthalic acid residue based on 100 mol % of the dibasic acid component, and (ii) a diol component comprising (a) 1 to 20 mol % of diethylene glycol, (b) 5 to 30 mol % of neopentyl glycol, and (c) 50 to 90 mol % of ethylene glycol, based on 100 mol % of the diol component.

The copolyester composition may comprise a conventional dibasic acid component such as dimethyl terephthalate (DMT) or terephthalic acid (TPA), preferably a dibasic acid component comprising terephthalic acid (TPA) residue in an amount of 90 mol % or more. When the amount falls within the above range, the film may have a micro-crystal structure generated by orientation of the film during drawing and heat-treatment processes, leading to an improved heat-resistance.

Further, the copolyester composition may comprise a diol component containing 1 to 20 mol % of diethylene glycol (DEG), 5 to 30 mol % of neopentyl glycol (NPG), and 50 to 90 mol % of ethylene glycol (EG), based on 100 mol % of the diol component.

When the content of diethylene glycol is 3 mol % or more, characteristics of the inventive film such as a low skirt ratio (S/R) and a constant shrinkage rate can be easily attained. When the content of diethylene glycol is 16 mol % or less, the heat-shrinkable film may have improved heat-resistance.

When the content of neopentyl glycol is in the range of 10 to 25 mol %, a satisfactory shrinkage ratio may be obtained and the resultant film labeled on a container may be hardly ruptured due to prevention of the excessive generation of oriented crystals during a heat-treatment process after drawing or generation of secondary oriented crystals during thermal shrinkage on a container.

The copolyester composition may further comprise a reaction catalyst, a polymer stabilizer, reaction additives, and inorganic materials, etc.

In accordance with a preferable example of the present invention, the copolyester composition may comprise 0.3 to 0.5 wt % of the polymer stabilizer (e.g., trimethyl phosphate), 0.2 to 0.4 wt % of the reaction catalyst (e.g., antimony trioxide), and 0.05 to 0.1 wt % of the inorganic material (e.g., silica).

As the reaction catalyst, acetate salts of metals such as magnesium, manganese and zinc may be used.

The copolyester composition used in the present invention preferably has an intrinsic viscosity of 0.6 to 0.9 dl/g. When the intrinsic viscosity is within the above range, the film can attain satisfactory mechanical properties such as strength and elongation so that the film can be hardly ruptured during post-processes such as printing and labeling.

The heat-shrinkable polyester film of the present invention preferably has a heat-shrinkage ratio of 50% or more, preferably 55% or more, along the main shrinkage direction when treated in hot water at 90° C. for 10 seconds. When the heat-shrinkage ratio is 55% or more, the film can achieve satisfactory shrinkage in full-wrapping processes for various shape containers even for the neck of a container.

Further, the inventive heat-shrinkable polyester film preferably has a skirt ratio (S/R) represented by formula (I) of 14% or less when treated in hot water at 90° C. for 10 seconds after fixing both ends in the main shrinkage direction of the film:

$$\text{Skirt Ratio}(\%) = (W-d)/L \times 100 \quad \text{(I)}$$

wherein, L is the length of the film in line with the main shrinkage direction, W is the width of the film before shrinkage, d is the width of the film after shrinkage.

When the skirt ratio is 14% or less, the film show improved resistance to a skirt phenomenon that a film labeled on a container having fixing points such as a square shape container is riding up at the center between the fixing points in the perpendicular to shrinkage direction, or a riding up phenomenon that a film labeled on a round shape container is entirely riding up in the perpendicular to its shrinkage direction, leading to a good finished appearance and indication of the printed label.

Further, the inventive heat-shrinkable polyester film has a maximum shrinkage stress of 6N or less, preferably 3.0N to 5.5N, when treated in hot water at 90° C. for 10 seconds. The maximum shrinkage stress is preferably measured using a film having a thickness of 40 μm. When the maximum shrinkage stress is 6N or less, the film may show high resistance to cracking, riding up or skirt phenomenon and avoid the distortion of the container during labeling.

The polyester film of the present invention may be prepared by a method comprising the steps of (a) melt-extruding the copolyester composition to obtain a sheet and then drawing the sheet in the main shrinkage direction at a temperature of Tg+5° C. to Tg+20° C., preferably by adjusting circumferential velocities of rolls or using a tenter, to obtain an oriented film; and (b) heat-treating the oriented film at a temperature ranges between Tg+5° C. and Tg+50° C.

Preferably, the heat-treatment process of Step (b) is conducted by fixing both ends in the main shrinkage direction of the oriented film and then passing the fixed film through a heat-treatment zone whose temperature ranges between Tg+5° C. and Tg+50° C.

The heat-treatment process is preferable in terms of a constant shrinkage rate, a high heat-shrinkage ratio of the obtained film, a low shrink stress, and a low skirt ratio. When the temperature of heat-treatment is from Tg+5° C. to Tg+50° C., the film can be heat-treated sufficiently and an excessive crystal growth can be prevented to maintain good mechanical properties.

The following Examples are intended to further illustrate the present invention without limiting its scope.

1. Preparation of Copolyester Resins

Copolyester resins were prepared according to the composition and contents shown in Table 1, by using a standard preparation method of copolyester which is conventionally used and well-known in the technical field of the present invention (e.g., Examples 1 to 7 of Korean Patent No. 10-0987065)

TABLE 1

| No | Composition (part by weight) | | | | Tg(° C.) | Type |
|---|---|---|---|---|---|---|
| | TPA | EG | NPG | DEG | | |
| Resin 11 | 100 | 80 | 20 | 0 | 78 | Copolymer |
| Resin 12 | 100 | 75 | 20 | 5 | 76 | Copolymer |
| Resin 13 | 100 | 70 | 20 | 10 | 71 | Copolymer |
| Resin 14 | 100 | 64 | 20 | 16 | 67 | Copolymer |

2. Preparation of Polyester Films

Polyester films were prepared by using Resins 11 to 14 as shown in Table 2. Each resin was melt-extruded to obtain a sheet, which was drawn at 80° C. in the main shrinkage direction at a ratio of 4.0 to obtain an oriented film. Both ends in the main shrinkage direction of the oriented film was fixed, and then the fixed film was heat-setted by passing rapidly through a heat-treatment zone whose temperature ranges between 85° C. and 105° C. to obtain a heat-shrinkable polyester film having a thickness of 40 μm.

TABLE 2

| No | Resin | Heat-treatment |
|---|---|---|
| Example 1 | Resin 12 | Treated |
| Example 2 | Resin 13 | Treated |
| Example 3 | Resin 14 | Treated |
| Example 4 | Resin 11/Resin 14 (30:70, w/w) | Treated |
| Comparative Example 1 | Resin 11 | Treated |
| Comparative Example 2 | Resin 11 | Non-treated |
| Comparative Example 3 | Resin 12 | Non-treated |
| Comparative Example 4 | Resin 13 | Non-treated |
| Comparative Example 5 | Resin 14 | Non-treated |

3. Properties of Polyester Films

The properties of the films prepared by Examples 1 to 4 and Comparative Examples 1 to 5 were evaluated by the following methods, and the results are shown in Table 3.

(1) Skirt Ratio (S/R)

Figure 2:
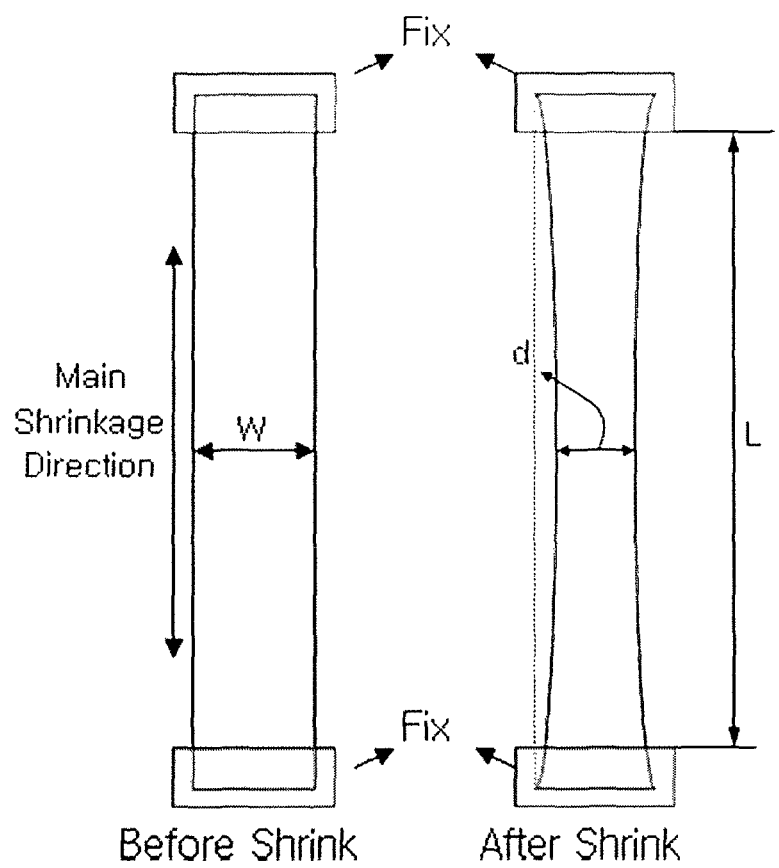
FIG. 2: an illustrative diagram showing a skirt ratio of a polyester film, wherein W is the width of the film before shrinkage, d is the width of the film after shrinkage, and L is the length of the film.

A film sample was cut into a piece of 13.0 cm (length)×6.0 cm (width) along the main shrinkage direction. Impurities on the sample surface was eliminated, the sample was fixed at both ends in the main shrinkage direction so that the length of the film does not change after shrinkage and then put in hot water at 90° C. for 10 seconds. As shown in FIG. 2, the width of the sample after shrink was measured, and the skirt ratio of the sample was calculated using the following equation:

Skirt Ratio(%)=[(width of sample before shrinkage−width of sample after shrinkage)/length of sample]×100

(2) Heat-Resistance

A glass transition temperature (Tg) of a film sample was measured by using DSC (differential scanning calorimetry). A Tg of 65° C. or more was graded as "O", and a Tg of less than 65° C. was graded as "X".

(3) Appearance Quality After Shrinkage

A film sample was wrapped on a cubic container whose weight is 22 g and one side is 6 cm and then passed through a steam-heating type shrinking tunnel. Thereafter, the appearance quality after shrinkage of the film was observed. Each film was tested 20 times. In case that shrinkage defects such as wrinkles or riding up of the film or a distortion of the container was found twice or less, the film was graded as "O", and 3 times or more, the film was graded as "X".

(4) Heat-Shrinkage Ratio

A film sample was cut into a piece of 300 mm (length)×15 mm (width) in line with the main shrinkage direction and put into a water bath maintained at 60° C., 70° C., 80° C., 90° C. or 100° C. for 10 seconds, and the change in the film length after the heat-treatment was measured. Using the following equation, the degree of shrinkage was calculated.

Heat-shrinkage Ratio(%)=[(300−length of sample after heat-treatment)/300]×100.

(5) Maximum Shrinkage Stress

A film sample was cut into a piece of 120 mm (length)×15 mm (width) along the main shrinkage direction and indicated at the points of 5 mm far from both sides to the length direction. The 110 mm-long film sample thus obtained was applied to an apparatus having the distance between chucks of 95 mm and equipped with a load cell for sensing a shrinkage stress attached to one of grips thereof. Thereafter, the apparatus equipped with the film sample was put in a water bath maintained at 90° C. When the degree of shrinkage of 13.6% was observed, the film sample was heat-treated for 1 min to obtain a maximum shrinkage stress.

TABLE 3

| No | Heat-resistance | S/R (%) | Appearance Quality after Shrinkage | Heat-shrinkage ratio (%) | | | | |
|---|---|---|---|---|---|---|---|---|
| | | | | 60° C. | 70° C. | 80° C. | 90° C. | 100° C. |
| Example 1 | O | 10 | O | 0 | 27 | 59 | 71 | 74 |
| Example 2 | O | 11 | O | 0 | 16 | 46 | 61 | 69 |
| Example 3 | O | 11 | O | 0 | 24 | 53 | 65 | 71 |
| Example 4 | O | 13 | O | 0 | 17 | 46 | 62 | 72 |
| Comparative Example 1 | O | 10 | Insufficient Shrinkage | 0 | 3 | 23 | 45 | 53 |
| Comparative Example 2 | O | 17 | X | 0 | 25 | 68 | 74 | 75 |
| Comparative Example 3 | O | 19 | X | 0 | 30 | 60 | 72 | 74 |
| Comparative Example 4 | O | 18 | X | 0 | 31 | 62 | 74 | 75 |
| Comparative Example 5 | O | 18 | X | 0 | 32 | 64 | 72 | 75 |

4. Analysis of Heat-Shrinkage Pattern of Polyester Film

Heat-shrinkage patterns of the films obtained in Examples 1 to 3 and Comparative Examples 1 and 2, and PVC and OPS films were measured and the results are shown in Table 4 and FIG. 1.

TABLE 4

| No | Heat-shrinkage (%) | | | | | S/R (%) | Shrinkage Stress (N) | Types |
| --- | --- | --- | --- | --- | --- | --- | --- | --- |
| | 60° C. | 70° C. | 80° C. | 90° C. | 100° C. | | | |
| Example 1 | 0 | 27 | 59 | 71 | 74 | 10 | 5.5 | Improved Polyester Film |
| Example 2 | 0 | 16 | 46 | 61 | 69 | 11 | 4.6 | OPS Like |
| Example 3 | 0 | 24 | 53 | 65 | 71 | 11 | 5.0 | PVC Like |
| PVC | 0 | 23 | 54 | 59 | 61 | — | — | — |
| OPS | 0 | 8 | 40 | 65 | 70 | — | — | — |
| Comparative Example 1 | 0 | 3 | 23 | 45 | 53 | 10 | 4.5 | Heat-treated, Polyester |
| Comparative Example 2 | 0 | 25 | 68 | 74 | 75 | 17 | 6.9 | Heat-treated, Polyester |

Using the heat-shrinkage ratios in Table 4, the heat-shrinkage change per degree Celsius (%/° C.) in the each temperature range along the main shrinkage direction was calculated and shown in Table 5.

TABLE 5

| No | Change per degree Celsius (%/° C.) | | | |
| --- | --- | --- | --- | --- |
| | 60~70° C. | 70~80° C. | 80~90° C. | 90~100° C. |
| Example 1 | 2.7 | 3.2 | 1.2 | 0.3 |
| Example 2 | 1.6 | 3.0 | 1.5 | 0.8 |
| Example 3 | 2.4 | 2.9 | 1.2 | 0.6 |
| PVC | 2.3 | 3.1 | 0.5 | 0.2 |
| OPS | 0.8 | 3.2 | 2.5 | 0.5 |
| Comparative Example 1 | 0.3 | 2.0 | 2.2 | 0.8 |
| Comparative Example 2 | 2.5 | 4.3 | 0.6 | 0.1 |

As shown in Tables 3 to 5 and FIG. 1, the inventive films of Examples 1 to 3 have more improved performance characteristics in terms of mechanical strength, heat-resistance and heat-shrinkage than the conventional films, and the inventive films showed an uniform heat-shrinkage required for full-wrapping.

While the invention has been described with respect to the above specific embodiments, it should be recognized that various modifications and changes may be made to the invention by those skilled in the art which also fall within the scope of the invention as defined by the appended claims.

What is claimed is:

1. A heat-shrinkable polyester film having a heat-shrinkage change per degree Celsius (%/° C.) along the main shrinkage direction of 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C., wherein the heat-shrinkable polyester film is prepared by using a copolyester composition comprising:

(i) a dibasic acid component comprising at least 90 mol % of terephthalic acid residue based on 100 mol % of the dibasic acid component; and (ii) a diol component comprising (a) 1 to 20 mol % of diethylene glycol, (b) 5 to 30 mol % of neopentyl glycol, and (c) 50 to 90 mol % of ethylene glycol, based on 100 mol % of the diol component.

2. The heat-shrinkable polyester film of claim 1, wherein the copolyester composition further comprises at least one selected from the group consisting of a reaction catalyst, a polymer stabilizer, a reaction additive, and an inorganic material.

3. The heat-shrinkable polyester film of claim 1, wherein the copolyester composition has an intrinsic viscosity of 0.6 to 0.9 dl/g.

4. A heat-shrinkable polyester film having a heat-shrinkage change per degree Celsius (%/° C.) along the main shrinkage direction of 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C., which has a heat-shrinkage ratio of 58% or more along the main shrinkage direction, a skirt ratio (S/R) represented by formula (I) of 14% or less, and a maximum shrinkage stress of 6N or less, when treated in hot water at 90° C. for 10 seconds:

$$\text{Skirt Ratio (\%)} = (W - d)/L \times 100 \quad (I)$$

wherein, L is the length of the film along the main shrinkage direction, W is the width of the film before shrinkage, and d is the width of the film after shrinkage.

5. A method for preparing a heat-shrinkable polyester film having a heat-shrinkage change per degree Celsius (%/° C.) along the main shrinkage direction of 1.5 to 3.0 in the range of 60° C. to 70° C., 2.5 to 3.5 in the range of 70° C. to 80° C., 1.0 to 2.0 in the range of 80° C. to 90° C., and 0.1 to 1.0 in the range of 90° C. to 100° C., the method comprising the steps of:

(a) melt-extruding a copolyester composition to obtain a sheet and then drawing the sheet in the main shrinkage direction at a temperature ranging from Tg+5° C. to Tg+20° C. to obtain an oriented film; and (b) heat-treating the oriented film at a temperature ranges between Tg+5° C. and Tg+50° C.

6. The method of claim 5, wherein the copolyester composition comprises:

(i) a dibasic acid component comprising at least 90 mol % of terephthalic acid residue based on 100 mol % of the dibasic acid component; and (ii) a diol component comprising (a) 1 to 20 mol % of diethylene glycol, (b) 5 to 30 mol % of neopentyl glycol, and (c) 50 to 90 mol % of ethylene glycol, based on 100 mol % of the diol component.

* * * * *